United States Patent [19]

Mosher

[11] Patent Number: 5,704,466
[45] Date of Patent: Jan. 6, 1998

[54] FEED TRAY ATTACHMENT FOR VIBRATORY FEEDER

[75] Inventor: Oren A. Mosher, Castro Valley, Calif.

[73] Assignee: Upper Limits Engineering Co., Livermore, Calif.

[21] Appl. No.: 605,904

[22] Filed: Feb. 23, 1996

[51] Int. Cl.[6] .................................................. B65G 27/00
[52] U.S. Cl. ............................................................. 198/771
[58] Field of Search .................................. 198/771, 750.1, 198/860.1

[56] References Cited

U.S. PATENT DOCUMENTS

| | | | |
|---|---|---|---|
| 4,966,273 | 10/1990 | Sashiki | 198/771 X |
| 5,085,314 | 2/1992 | Higson | 198/771 X |
| 5,184,716 | 2/1993 | Gaines | 198/771 X |
| 5,277,300 | 1/1994 | Maggioni | 198/771 X |

*Primary Examiner*—D. Glenn Dayoan
*Attorney, Agent, or Firm*—McCormick, Paulding & Huber

[57] ABSTRACT

The vibratory feeder utilizes a releasable attachment mechanism for connecting a feed tray to a vibrator for ease of removal and installation. The attachment mechanism has a first coupling in the form of z-blocks which when pressed together align the feed tray with the vibrator and firmly affix the tray against motion toward and away from the vibrator at the coupling. A second coupling displaced from the first coupling utilizes two pin blocks which are locked together by two press-fit pins. The pin blocks, when locked together, firmly fix the feed tray to the vibrator at the second coupling and simultaneously press the Z-blocks together at the first coupling.

14 Claims, 2 Drawing Sheets

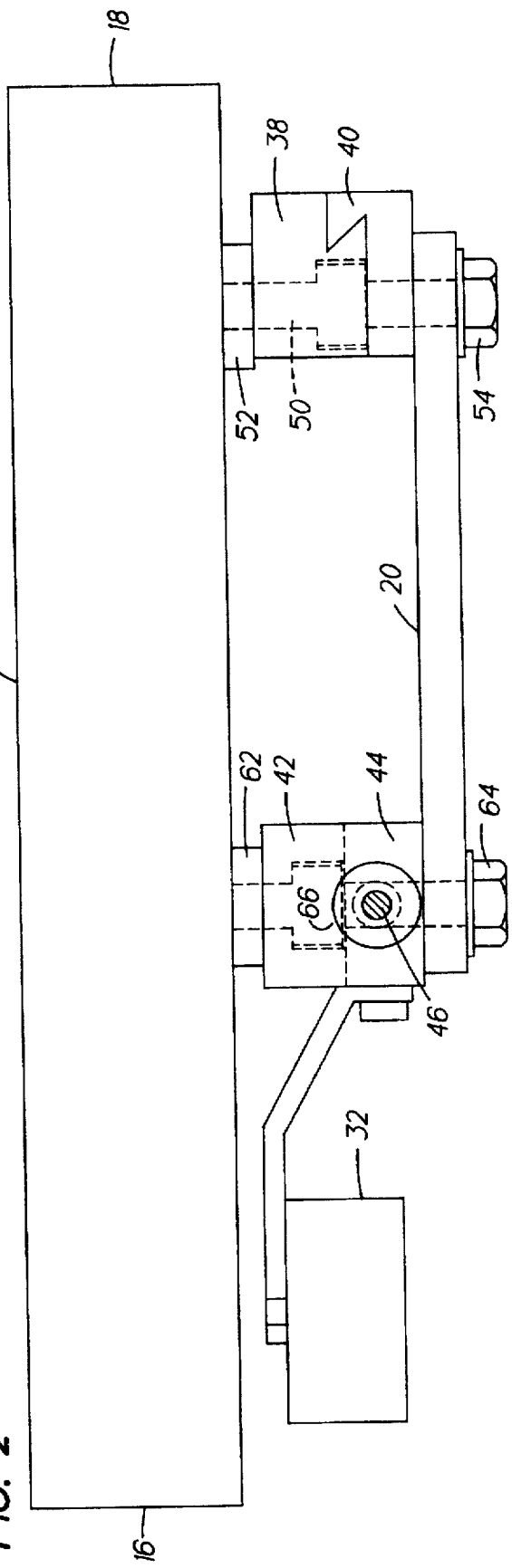
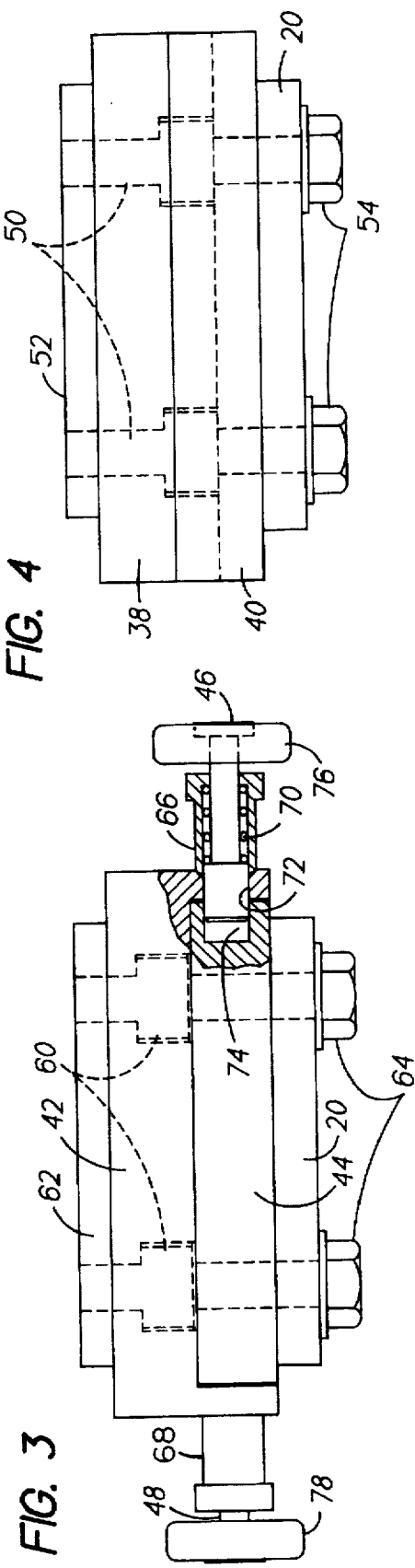

5,704,466

FEED TRAY ATTACHMENT FOR VIBRATORY FEEDER

BACKGROUND OF THE INVENTION

The present invention relates to a vibratory feeder of a type used to feed a product, particularly in a weighing or packaging machine. The product may be finely divided material such as rice, cereal flakes or screws, or may include larger piece products such as food pouches and chicken parts.

Vibratory feeders are well known in packaging and weighing machines as indicated by U.S. Pat. No. 4,534,428. Such machines frequently handle food products, and the feed trays or troughs in the machines must be periodically cleaned during use or when the type of product being handled by the machine is changed. Washing the feed trays while they are installed in the machine is not desirable since the soap, water and other cleaning compounds are splashed over the rest of the machine including the electrical systems and components, the mechanical drive mechanisms and conveyors and the electronic controls which regulate the operation of the machines. Ideally the feed trays are removed from the machine and immersed in separate washing tanks to ensure a complete and thorough cleaning and decontamination. Thereafter the feed trays are re-installed in the machine.

However, the removal and installation of feed trays for purposes of cleaning or for changing the trays to handle different products is not without some difficulties. The feed trays must be rigidly connected with the base plate of a vibrator which shakes the tray and the product therein in order to cause the product to flow smoothly and continuously through the tray. The attachment mechanism between the tray and the base plate to the vibrator must necessarily carry all of the vibratory loads as well as the weight of the product and the tray. Any flexing or looseness in the attachments will not only reduce the performance of the vibrator but most likely will result in damage to the attachment structure, the tray or the vibrator during operation.

It is accordingly a general object of the present invention to provide a vibratory feeder with a releasable attachment mechanism that enables the feed tray to be quickly removed from and installed in the vibrator and which at the same time provides a secure connection to the vibrator when the tray is installed.

SUMMARY OF THE INVENTION

The present invention resides in a vibratory feeder having a feed tray for feeding a product in a feed direction toward a discharge opening in the tray. A typical tray has a trough configuration which is open at one end to allow the product to be discharged out of the tray into another feeder, weigh scale or packaging machine.

Within the feeder vibrator means having a vibrated base plate generates and transmits vibratory motions predominantly in a given direction from the base plate into the feed tray and to product in the tray.

Releasable attachment means connect the feed tray to and release the feed tray from the base plate of the vibrator means, and includes a first coupling having two parts, such as Z-blocks, which when pressed together in a direction generally parallel to the feed direction firmly affix the feed tray to the base plate at the first coupling and simultaneously align the feed direction of the tray with respect to the given direction of the vibrator means. A second coupling displaced in the feed direction from the first coupling has two parts which when locked together firmly affix the feed tray to the base plate at the second coupling and simultaneously press the two parts of the first coupling together in the feed direction. For example, the two parts may be pin blocks which are connected respectively to the feed tray and the base plate, and which are locked together by means of one or more manually insertable pins.

BRIEF DESCRIPTION OF THE DRAWINGS

FIG. 2 is side elevation view of the attachment mechanism between the vibrator base plate and feed tray of the vibratory feeder in FIG. 1.

FIG. 3 is a front elevation view, partially in section, of the front coupling between the base plate and feed tray in FIG. 2.

FIG. 4 is a rear elevation view of the rear coupling between the vibrator base plate and the feed tray in FIG. 2.

DESCRIPTION OF THE PREFERRED EMBODIMENTS

Figure 1:
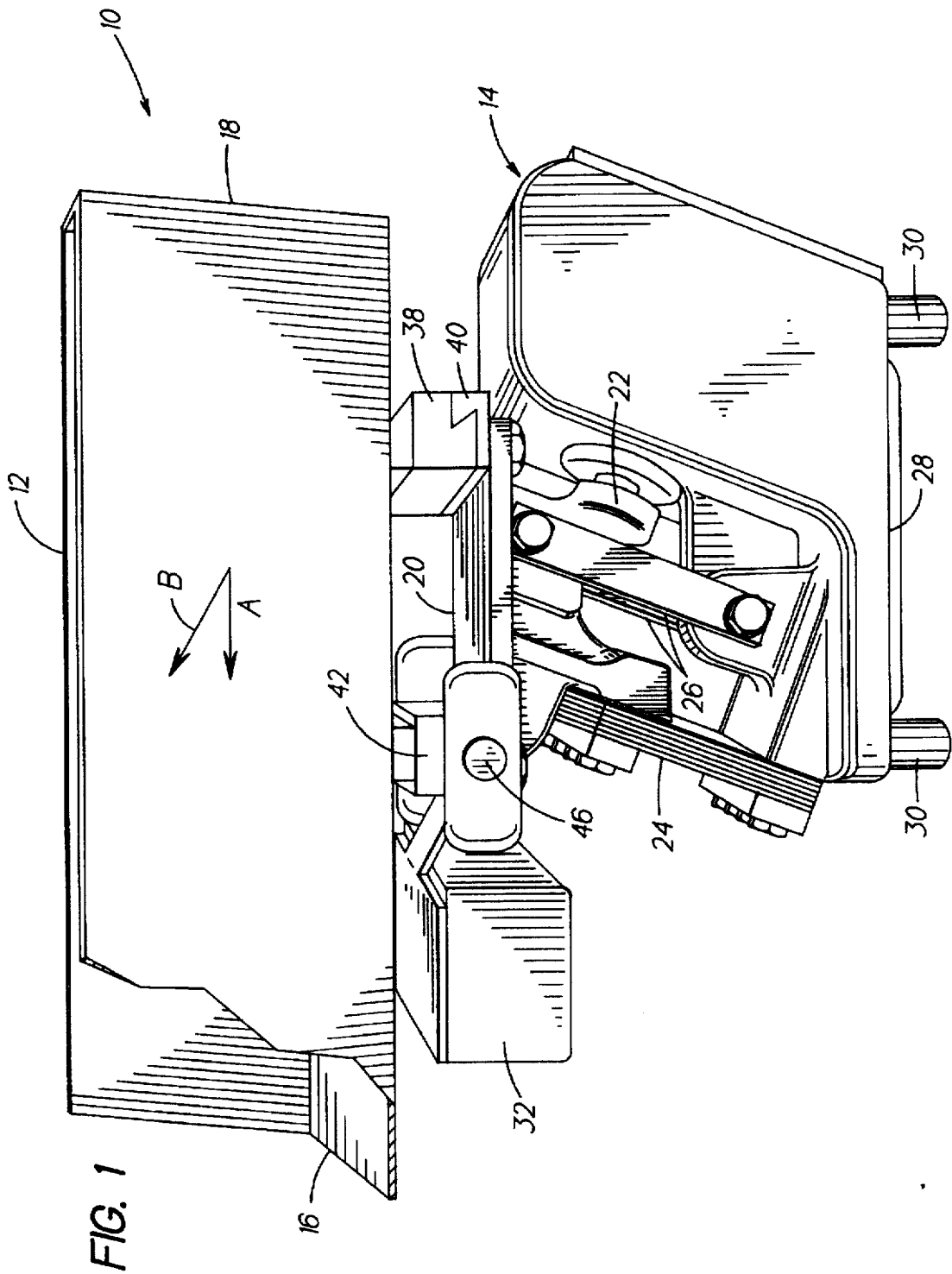
FIG. 1 is a perspective view from the side of a vibratory feeder incorporating the present invention.

FIG. 1 illustrates a vibratory feeder, generally designated 10. The feeder includes a generally U- or V-shaped feed tray 12 typically formed from stainless steel and supported on an electrically driven and controlled vibrator 14. Product deposited in the tray 12 from another feeder or a bulk tank above is moved through the tray in the direction indicated by the arrow A when the tray is vibrated by the vibrator 14, and is discharged through the opening at the front or left-hand end 16 of the tray as viewed in FIG. 1. The rear or right-hand end 18 of the tray is closed by a side wall (not shown).

The vibratory feeder may be used in a weighing or packaging machine in which a series of vibrators are utilized so that the product discharged from the front end 16 spills or cascades into another vibrator tray or into a weigh scale for weighing prior to packaging. To feed the product toward the discharge end 16, the vibrator 14 generates vibratory forces predominantly in a direction indicated by the arrow B which extends in the same vertical plane as the feed direction designated by the arrow A and at approximately 20° to the arrow A.

The feed tray 12 is connected to a vibrated base plate 20 of the vibrator 14 by means of a releasable attachment mechanism described in further detail below so that the tray can be easily removed from the vibrator 14 for cleaning or replacement and can be easily installed on the vibrator when needed. The base plate 20 is vibrated by means of a drive armature 22 that is part of the drive motor within the vibrator 14. In addition to the armature 22, the base plate 20 is supported by a four-bar linkage including a set of spring plates 24 and parallel links 26 connected between the base plate and housing 28 of the vibrator. The housing in turn rests on four isolation springs 30. An accelerometer 32 may be connected to the base plate 20 for purposes of vibrator control.

The releasable attachment mechanism between the feed tray 12 and the vibrator base plate 20 is shown more particularly in FIGS. 2–4. The feed tray 12 is coupled near the rear end 18 to the vibrator base plate by means of a set of Z-blocks 38,40, and is connected near the front end 16 to the base plate by means of pin blocks 42,44 and a set of manually insertable lock pins 46 and 48.

The coupling formed by the Z-blocks 38 and 40 serves to both fix the feed tray to the base plate and simultaneously align the feed direction of the tray with respect to the base plate and the dominant direction of vibration when the complementary Z-shaped projections and recesses and the interengaging edges of the blocks are pressed together. The block 38 is held in alignment with the feed direction of the tray 12 by a set of cap screws 50 which are securely threaded through the block 38 into a reinforcing plate 52 welded to the bottom side of the tray. The block 40 is correspondingly aligned with the dominant direction of vibration of the base plate 20 by means of bolts 54 which pass upwardly through the base plate and are securely threaded into the block 40. The Z-blocks 38 and 40 when engaged with one another fix the feed tray 12 vertically and serve to orient the tray with respect to the vibrator as the tray is installed. Aligning the tray is, accordingly, a relatively simple operation that is accomplished by bringing the two Z-blocks 38,40 into engagement.

The forward coupling between the feed tray 12 and the base plate 20 is provided by the pin blocks 42 and 44 which are displaced toward the front end of the tray from the Z-blocks 38,40. The forward coupling serves to position the feed tray laterally with respect to the base plate and to also fix the tray vertically and in the feed direction with respect to the base plate. As shown in FIG. 3, the block 42 has a generally U-shape with a central slot or cutout in which the pin block 44 is captured with limited clearance at the sides of the slot. The block 42 is attached to the bottom of the feed tray 12 by means of cap screws 60 which are securely fastened to the reinforcing plate 62 welded to the bottom of the tray. The pin block 44 is fixed to the vibrator base plate 20 by means of bolts 64 which pass through the plate 20 into the block. Since the Z-blocks 38,40 and the pin blocks 42,44 transmit vibratory loads into the feed tray, the cap screws 50,60 and the bolts 54,64 need to be torqued sufficiently and preferably are locked in place with an anaerobic adhesive.

Lock pins 46,48 secure the block 42 to the block 44 and are slidably mounted within housings 66,68 permanently fixed to the pin block 42. The structure of the lock pins and housings is identical and, therefore, only the construction and operation of the pin 46 is described below in detail.

A primary portion of the pin 46 has a reduced diameter, and within the housing 66 is surrounded by a coil spring 70 which biases the pin inwardly of the housing with a slight force. The enlarged end of the pin 46 passes through a reamed hole 72 in the block 42 and into a reamed hole 74 of the block 44 to lock the two blocks together and correspondingly lock the feed tray 12 to the vibrator base plate 20. The reamed holes 72 and 74 have a size which requires the enlarged end of the pin 46 to be manually pressed into the holes by pressure applied to the handle 76 attached to the end of the pin. The force of the spring 70 is insufficient for this purpose. Correspondingly, to disengage the pin blocks 42 and 44, the operator must pull the pin 46 out of the hole 74 by means of the handle 76.

When the pins 46 and 48 are pressed inwardly by means of the handles 76,78, the pin blocks 42,44 cannot move relative to one another, and the vibrations of the base plate 20 are transmitted through the blocks to the feed tray 12. Additionally, however, the pin blocks 42,44 are positioned relative to the Z-blocks 38,40 so that when the pins 46,48 are pressed inwardly, the Z-blocks 38,40 are also pressed firmly together which connects the feed tray to the base plate without any freedom of motion. Consequently, the Z-blocks 38,40, the pin blocks 42,44 and the pins 46,48 rigidly connect the feed tray 12 to the vibrator base plate 20 and transmit the vibrations between the tray and plate without attenuation. The pins 46 and 48 being press fit into the pin blocks 42,44 are not loosened by the vibrations and hence ensure that the feed tray 12 and base plate 20 remain securely fastened together.

When the feed tray is to be removed for cleaning or replacement, the operator simply pulls the handles 76,78 together with the lock pins 46,48 outwardly to disengage the pin blocks 42,44. The feed tray 12 is simply pulled slightly to the left in FIGS. 1 or 2 to disengage the Z-blocks 38,40 and then upwardly to free the tray completely from the base plate. The installation of the feed tray is also easily accomplished by reversing the procedure.

A further advantage of the attachment mechanism is that the Z-blocks 38,40 can be positioned at the rear end of the feed tray with respect to the flow of product and the tray can be removed with access at the front end only.

While the present invention has been described in a preferred embodiment, it should be understood that numerous modifications and substitutions can be made without departing from the spirit of the invention. For example, while the complementary projections and recesses of the blocks 38,40 define a z-shape, the same effect is produced by other configurations such as a V-shape or a semi-cylindrical shape. The pin blocks 42 and 44 may likewise have different shapes as long as the blocks can be locked together while the Z-blocks or other blocks at the rear of the attachment are simultaneously pressed into a firm, locking relationship. Also, the configuration of the feed tray and the base plate of the vibrator may take numerous forms and shapes suitable for their intended functions. Accordingly, the present invention has been described in several different embodiments by way of illustration rather than limitation.

I claim:

1. A vibratory feeder comprising:

a feed tray for feeding product in the tray in a feed direction toward a discharge opening in the tray, vibrator means having a vibrated base plate for generating and transmitting vibrations predominantly in a given direction to the feed tray and product therein; and releasable attachment means for connecting the feed tray to and releasing the feed tray from the base plate of the vibrator means including, a first coupling having two parts which when pressed in together in a direction parallel to the feed direction firmly affix the feed tray to the base plate at the first coupling and simultaneously align the feed direction of the tray with respect to the given direction of the vibrator means, and a second coupling displaced parallel to the feed direction from the first coupling, and having two parts which when locked together firmly fix the feed tray to the base plate at the second coupling and simultaneously press the two parts of the first coupling together in the feed direction.

2. A vibratory feeder as defined in claim 1, wherein the two parts of the first coupling are interengaging parts which when pressed together in the direction parallel to the feed direction eliminate movement of the tray relative to the base plate in a direction normal to the feed direction at the first coupling.

3. A vibratory feeder as defined in claim 1, wherein the two parts of the first coupling are interengaging Z-blocks.

4. A vibratory feeder as defined in claim 3, wherein the Z-blocks have interengaging edges extending in a direction generally transverse to the feed direction.

5. A vibratory feeder as defined in claim 1, wherein the two parts of the second coupling are locked together by a pin.

6. A vibratory feeder as defined in claim 5, wherein the pin is manually insertable and removable to lock and unlock the two parts respectively.

7. A vibratory feeder as defined in claim 1, wherein the one part of the second coupling is captured within the other part, and a manually installed pin is used to lock the two parts together.

8. A vibratory feeder as defined in claim 7, wherein the one part of the second coupling has a slot in which the other part is captured.

9. A vibratory feeder as defined in claim 1, wherein:

the two parts of the first coupling are Z-blocks with interengaging edges extending in a direction generally transverse to the feed direction of the tray; and the two parts of the second coupling are locked together by means of a manually insertable pin extending in a direction transverse to the feed direction.

10. In a vibratory feeder having an elongated feed tray for feeding product from one end of the tray in a generally horizontal feed direction toward a discharge point at the other end of the tray, and a vibrator including a base plate driven with vibratory motions so as to advance the product in the tray in the feed direction, the improvement comprising:

a manually releasable mechanism for attaching the feed tray to and detaching the feed tray from the base plate including, a first coupling having two parts which are separable in a direction generally parallel to the feed direction and which, when held against separation, also fix the tray vertically with respect to the vibrator base plate at the first coupling and simultaneously align the feed tray with respect to the base plate; and a second coupling having two parts which, when locked together, hold the two parts of the first coupling together against separation in the direction generally parallel to the feed direction and fix the tray vertically and in the feed direction with respect to the base plate at the second coupling.

11. The improvement of claim 10, wherein the first coupling and the second coupling are displaced from one another in a direction parallel to the feed direction, the second coupling being located closer to the discharge point of the feed tray than the second coupling.

12. The improvement of claim 10, wherein the two parts of the first coupling are interengaging blocks having a complementary projection and recess extending in a direction transverse to the feed direction.

13. The improvement of claim 10, wherein the two parts of the first coupling are blocks with interengaging projections and recesses forming a Z-shape.

14. The improvement of claim 10, wherein a manually insertable pin is employed to lock the two parts of the second coupling together.

* * * * *